United States Patent [19]
Oguchi et al.

[11] Patent Number: 5,471,458
[45] Date of Patent: Nov. 28, 1995

[54] MULTI-PROBE INFORMATION RECORDING/REPRODUCING APPARATUS INCLUDING A PROBE DISPLACEMENT CONTROL CIRCUIT

[75] Inventors: Takahiro Oguchi, Yamato; Katsunori Hatanaka, Yokohama; Kunihiro Sakai, Isehara; Akihiko Yamano; Shunichi Shido, both of Sagamihara, all of Japan

[73] Assignee: Canon Kabushiki Kaisha, Tokyo, Japan

[21] Appl. No.: 117,675

[22] Filed: Sep. 8, 1993

[30] Foreign Application Priority Data

Sep. 10, 1992 [JP] Japan ................................. 4-242246
Aug. 27, 1993 [JP] Japan ................................. 5-213120

[51] Int. Cl.⁶ .................................................. G11B 9/00
[52] U.S. Cl. .......................... 369/126; 369/101; 250/306
[58] Field of Search .................................. 369/126, 101; 250/306

[56] References Cited

U.S. PATENT DOCUMENTS

| | | | |
|---|---|---|---|
| 5,162,653 | 11/1992 | Hosaka et al. | 250/306 |
| 5,182,724 | 1/1993 | Yanagisawa et al. | 369/126 |
| 5,202,879 | 4/1993 | Oguchi et al. | 369/126 |
| 5,216,254 | 6/1993 | Ohta et al. | 250/306 |
| 5,237,859 | 8/1993 | Elings et al. | 250/306 |
| 5,329,122 | 7/1994 | Sakai et al. | 369/126 |
| 5,394,388 | 2/1995 | Hatanaka et al. | 369/126 |

FOREIGN PATENT DOCUMENTS

| | | |
|---|---|---|
| 0174860 | 3/1986 | European Pat. Off. . |
| 0263305 | 4/1988 | European Pat. Off. . |
| 0271230 | 6/1988 | European Pat. Off. . |
| 0325056 | 7/1989 | European Pat. Off. . |
| 0363550 | 4/1990 | European Pat. Off. . |
| 0361932 | 4/1990 | European Pat. Off. . |
| 0452852 | 10/1991 | European Pat. Off. . |
| 61-80536 | 4/1986 | Japan . |
| 63-151553 | 7/1988 | Japan . |
| 63-161552 | 7/1988 | Japan . |
| 1-196751 | 8/1989 | Japan . |

OTHER PUBLICATIONS

Binning, et al., "Surface Studies by Scanning Tunneling Microscopy", Jul. 1982, Physical Review Letters, vol. 49, No. 1, pp. 57–61.

Emch, et al, "Characterization and Local Modification of Atomically Flat Gold Surfaces by STM", Oct. 1988, Journal of Microscopy, vol. 152, Pt. 1, pp. 129–135.

Albrecht, et al., "Microfabrication of Integrated Scanning Tunneling Microscope", 1–2 1990, Journal of Vacuum Science & Technology A, Second Series, vol. 8, No. 1, pp. 317–318.

"Nikkei Microdevices", Nov. 1986, pp. 81–97.

Primary Examiner—Georgia Y. Epps
Assistant Examiner—Kim-Kwok Chu
Attorney, Agent, or Firm—Fitzpatrick, Cella, Harper & Scinto

[57] ABSTRACT

An information processing apparatus is provided with a plurality of probes facing a sample, a signal detection circuit, a selection circuit and a memory circuit. The signal detection circuit is selectively connected to the plurality of probes by the selection circuit. A compensation value for compensating for a variation in a detection signal detected by the signal detection circuit when the selection circuit connects one of the plurality of probes to the detection circuit is stored in the memory circuit. The compensation value is provided for the respective probe.

18 Claims, 10 Drawing Sheets

MULTI-PROBE INFORMATION RECORDING/REPRODUCING APPARATUS INCLUDING A PROBE DISPLACEMENT CONTROL CIRCUIT

BACKGROUND OF THE INVENTION

1. Field of the Invention

The present invention relates to an information processing apparatus of a recording/reproducing apparatus for writing or reading information to/from a medium, which faces a plurality of probes by a physical interaction, a scanning tunneling microscope (STM), or the like and, more particularly, to a control circuit of a plurality of probes.

2. Related Background Art

In recent years, a scanning tunneling microscope (hereinafter, abbreviated to STM) which can directly observe an electron structure of surface atoms of a conductor has been developed (refer to G. Binnig et al., "Phys Rev Lett" Vol. 49, Nol, p. 57–61, 1982) A real space image can be measured at a high resolution irrespective of a monocrystal or an amorphous material.

The STM uses a phenomenon such that when a voltage is applied between a metal probe (probe electrode) and a conductive material and the probe is allowed to approach up to a distance of about 1 nm, a tunnel current flows. The tunnel current is very sensitive to a change in distance between the probe and the material. By scanning the probe so as to keep the tunnel current constant, various kinds of information regarding a whole electron cloud in the real space can also be read. In this instance, a resolution in the in-plane direction is equal to about 0.1 nm.

Therefore, by applying the principle of the STM, high density recording or reproduction can be sufficiently executed on the order of atoms (sub nanometer). For example, in a recording/reproducing apparatus disclosed in Japanese Patent Laid-open Application No. 61-80536, atomic particles adsorbed on the medium surface are removed by an electron beam or the like and data is written and the data is reproduced by the STM.

There has also been proposed a method whereby a thin film layer made of a material having a memory effect for the switching characteristics of a voltage current, for example, a $\pi$ electron system organic compound or chalcogen compound class is used as a recording layer and the recording or reproducing operation is executed by the STM (refer to Japanese Patent Laid-open Application No. 63-161552, Japanese Patent Laid-open Application No. 63-161553). According to such a method, now assuming that a size of recording bit is equal to 10 nm, the recording or reproduction of a large capacity of $10^{12}$ bits/cm$^2$ can be performed. Further, an apparatus such that a plurality of probes are formed on a semiconductor substrate and a displacement is caused in a recording medium which faces those probes and data is recorded has been proposed for the purpose of miniaturization (Japanese Patent Laid-open Application No. 1-196751). For example, a multiprobe head in which 2500 probes are arranged on a silicon chip of a square size of 1 cm$^2$ in a matrix form of (50×50) probes and the above material having the memory effect are combined, so that digital data of 400 Mbits per probe, a total recording capacity of 1 Tbits, can be recorded or reproduced.

In this instance, a method whereby each probe is formed in a cantilever shape having a length of about hundreds of µm and is driven is considered. Hitherto, as a method of forming such a cantilever, there is a method whereby a semiconductor process is applied and by using a working technique for performing a fine working process onto one substrate, a cantilever having a multilayer structure such as a thin piezoelectric film, metal film, or the like is formed. (Refer to T. R. Albrecht et al., "Microfabrication of Integrated Scanning Tunneling Microscope", Proceedings of 4th International Conference on Scanning Tunneling Microscope/Spectroscopy, 1990.)

Such an information processing apparatus using the tunnel current or field radiation current has a function to keep the distance between the probe and the sample constant. A signal processing circuit of the information processing apparatus having such a function has been described in, for example, "Nikkei Microdevice", Vol. November, pages 81 to 97, 1986. In such a signal processing circuit, by using a fact that the tunnel current can be expressed by the following equation $$I = EXP(-K \cdot z)$$

where,

I: tunnel current z: distance between the probe and the sample

K: constant the detected tunnel current is logarithm-converted and supplied to a servo circuit, and the interval between the probe and the sample is controlled on the basis of an output of the servo circuit such as to keep the tunnel current constant. In the above equation, the constant value K is a value to which a work function of the tip of the probe and the sample is reflected. It is known that the value of the work function of the STM probe changes in dependence on a contamination or the like of the probe. (Refer to "Journal of Microscopy", Vol. 152, Ptl, pages 129 to 135, 1988.)

There are, however, the following problems when the multiprobe head having a plurality of probes and the medium which faces it are actually combined and an information process such as recording, reproduction, or are like the executed.

(1) When executing the information process such as recording, reproduction, or the like, it is necessary to precisely control the distance (in the Z direction) between each probe of the multiprobe head and the medium which faces it. For this purpose, there is considered a method whereby, for example, a control system for performing the Z direction control of the distance between the probe and the medium is provided for every probe and a control section comprising each control system is provided on the outside of the probe head. In such a case, although the multiprobe head can be constructed in a small size, there are problems such that the control section which is provided on the outside of the apparatus is increased in size by a volume corresponding to the number of probes and it is difficult to realize a small information processing apparatus which advantageously uses a feature of the STM.

(2) In the case of forming a plurality of probes by a fine working process such as an IC process or the like, the occurrence of a variation in the working process cannot be avoided. Such a variation in working process, for example, causes a variation in displacement sensitivity of an actuator such as a piezoelectric cantilever or the like or a variation in sensitivity of the probe tip, namely, a variation in work function value, so that it makes it difficult to control a plurality of probes. In a surface observing apparatus .such as an STM or the like, a variation in change in brightness of a surface concave/convex signal of each probe is caused. In the recording/ reproducing apparatus, a variation in amplitude of a reproduction signal is caused for every probe, so that a reproduction error occurs.

SUMMARY OF THE INVENTION

The present invention is made in consideration of the problems of the conventional techniques as mentioned above and, it is an object of the invention to provide a small control circuit of a multiprobe of a high precision and to realize various kinds of information processing apparatuses.

According to the invention, the above object is accomplished by an information processing apparatus for reproducing recorded information by using a signal which occurs due to a physical phenomenon between a plurality of probes and a sample which faces those probes, in which the apparatus comprises: a plurality of probes; a single signal detecting circuit which is selectively connected to those plurality of probes; a selecting circuit to selectively connect the signal detecting circuit to the plurality of probes; and a memory circuit for storing a compensation value corresponding to each of the plurality of probes, wherein the compensation for value is used to compensate a detection signal which is detected by the signal detecting circuit when the selecting circuit connects one of the plurality of probes to the signal detecting circuit.

The above object is also accomplished by an information processing apparatus for recording a recording signal onto a material by causing a physical phenomenon between a plurality of probes and the sample which faces those probes, in which the apparatus comprises: a plurality of probes; a single signal recording circuit which is selectively connected to those plurality of probes; a selecting circuit to selectively connect the signal recording circuit to the plurality of probes; and a memory circuit for storing a compensation value corresponding to each of the plurality of probes, wherein the compensation value is used to compensate for a recording signal which is supplied from the signal recording circuit when the selecting circuit connects one of the plurality of probes to the signal recording circuit.

DETAILED DESCRIPTION OF THE PREFERRED EMBODIMENTS (Embodiment 1)

Figure 1:
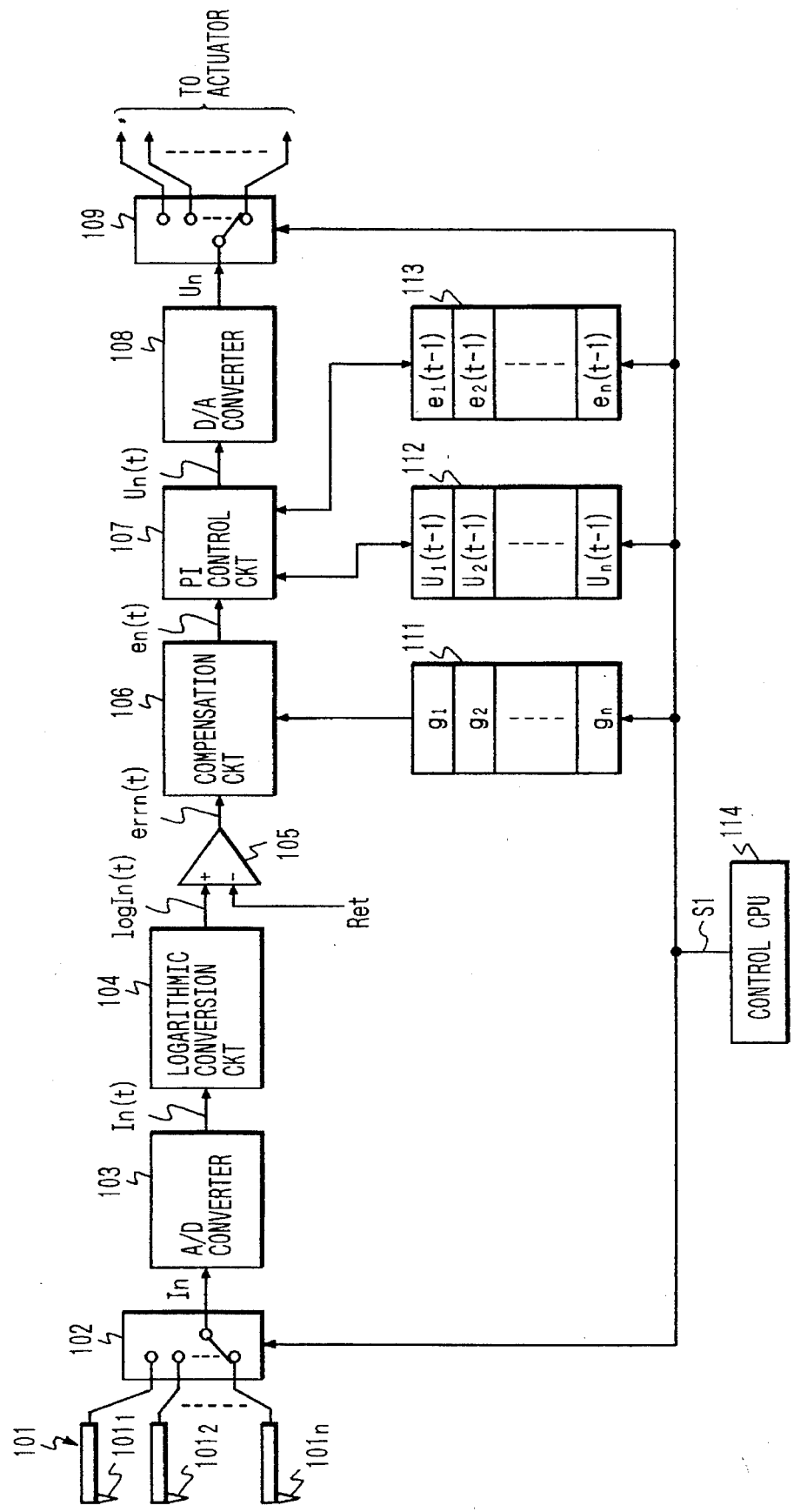
FIG. 1 is a diagram showing an example of a construction of a control circuit of a multiprobe in the first embodiment of the invention.

FIG. 1 is a diagram showing an example of a construction of a control circuit for a multiprobe according to the first embodiment of the invention.

The control circuit shown in this embodiment relates to a circuit to control the distance between a plurality of probes which detect a tunnel current and a medium which faces those probes.

In the embodiment, there is constructed a digital servo system such that a tunnel current signal from each probe is converted into a digital signal by using a control CPU 114 and a control signal to sequentially control each probe in the Z direction is produced from the digital signal according to a timing from the control CPU 114.

The Z direction control of the multiprobe will now be described in detail with reference to FIG. 1.

Each of a plurality of probes $101_1$, $101_2$, . . . , $101_n$ constructing the multiprobe 101 is connected to a selecting circuit 102. In accordance with a timing signal from the control CPU 114, the selecting circuit 102 selects either one of the probes $101_1$ to $101_n$, for instance, the nth probe. A tunnel current signal In detected by the selected nth probe is converted into a voltage value and is subsequently converted into a digital value In(t) by an A/D converter 103 (t denotes a predetermined sampling time).

The digital tunnel current signal is converted into a linearization signal corresponding to the distance between the probe and the medium by a logarithmic converter 104 [in the diagram: login(t)]. An output of the logarithmic converter 104 is supplied to a comparator 105, by which it is compared with a set value of a servo circuit. An error signal [in the diagram: errn(t)] is derived from the comparator 105. In this instance, the control CPU 114 addresses a memory 111 of the number of the selected probe. A compensation amount (g1 to gn) corresponding to the probe number is generated from the memory 111 to a compensation circuit 106.

The compensation circuit 106 multiplies the compensation coefficient gn from the memory 111 to the output errn(t) from the comparator 105, thereby obtaining a compensation error signal [in the diagram: en(t)]. Reference numeral 107 denotes a control circuit to produce a distance control signal [in the diagram: Un(t)] to set the compensation error signal to zero. Specifically speaking, a PI (Proportional+Integral) control circuit is used as a control circuit 107. The PI control circuit 107 produces a new distance control signal Un(t) at a time (t) from the distance control signal and compensation error signal data at-a sampling time (t-1) stored in memories 112 and 113 and from the compensation error signal en(t) at the sampling time (t). At the same time, the PI control circuit 107 updates the values in the memories 112 and 113.

The distance control signal Un(t) is again converted into the analog signal by a D/A converter 108. After that, the analog signal is supplied to an actuator (not shown) to drive the probe of the corresponding number in the Z direction by a switching circuit 109. The control CPU 114 sequentially switches the probe to be selected and performs the Z direction control to all of the probes. The actuator is set into a floating state for a period of time from a time point when the signal has once been applied to the actuator to a time point when the signal is again supplied to the same actuator. For this period of time, the control voltage is held by a capacity between the electrodes of the actuator, so that a displacement of the actuator is held.

Each of the above digital arithmetic operating/converting circuits 103 to 108 can be operated at a sufficiently high speed faster than the sampling period. However, it is also possible to execute what is called a pipeline process such that a data storing memory is provided for each arithmetic operation. By using the pipeline process, each of the operating/converting circuits 103 to 108 can reduce the operating frequency to the sampling frequency, so that the size and costs of the circuit can be decreased.

Figure 2:
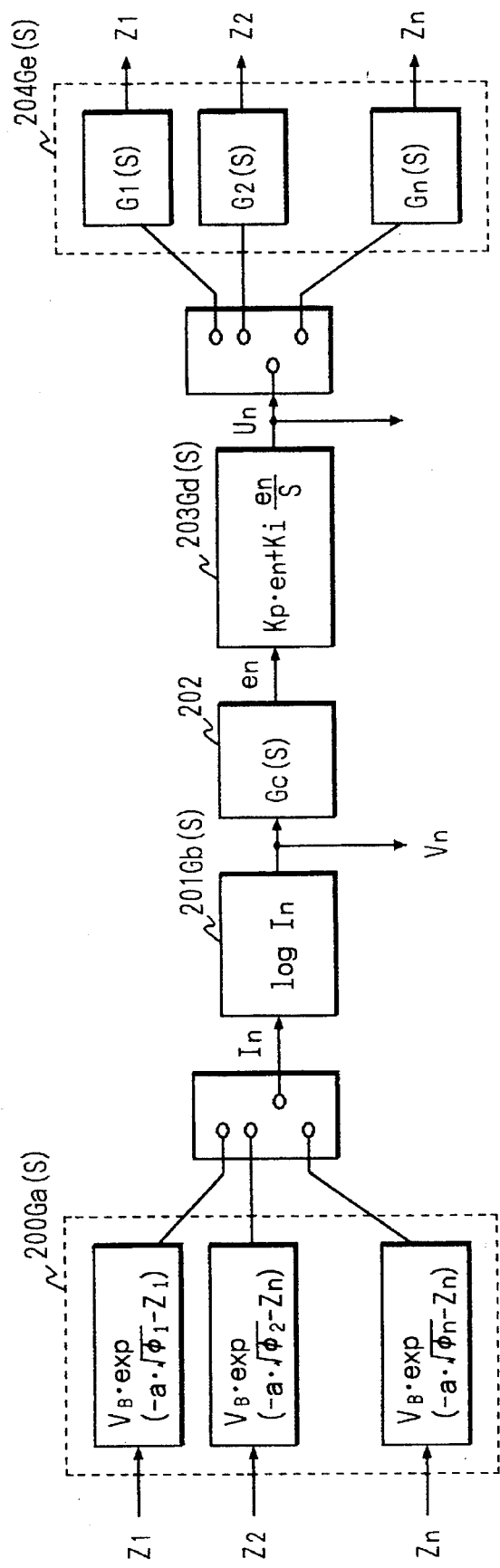
FIG. 2 is a block diagram showing a control system in the control circuit shown in FIG. 1.

FIG. 2 is a block diagram of a control system in the control circuit shown in FIG. 1.

Although the servo control system in FIG. 1 is a digital servo system, it is possible to consider that the servo control system is approximated to an analog servo system because the sampling interval is generally equal to a few μsec and is sufficiently smaller than that of the control signal band. The operation of the compensation circuit in FIG. 1 will be described in detail with reference to FIG. 2.

Ga(s): 200 denotes a block indicative of converting characteristics from a displacement of the multiprobe to the tunnel current. Gb(s): 201 denotes a block showing converting characteristics of the logarithmic converter. Gc(s): 202 denotes a block showing the compensation circuit. Gd(s): 203 denotes a block showing the PI control circuit. Ga(s): 204 denotes a block showing converting characteristics from the voltage of the Z driving device of the multiprobe to the displacement. $V_B$ denotes a bias voltage between the probe and the medium; ø1 to øn indicate work function values of the probes; G1(s) to Gn(s) indicate converting characteristics from the voltage of the Z driving device of each multiprobe to the displacement; and a, Kp, Ki show constants.

As mentioned above, when there are a plurality of probes, a variation occurs in the displacement sensitivity of the Z driving device of a sensitivity of the probe tip. Namely, the work function value varies. The work function values ø1 to øn and the converting characteristics from the voltage of the Z driving device to the displacement, namely, G1(s) to Gn(s) differ for every probe.

In this instance, in the closed loop of FIG. 2, when considering transfer characteristics from the output Un of the PI control circuit 203 to the output Vn of the logarithmic converter 201, they are expressed as follows.

$$\begin{aligned}Vn &= Gb(s) \times Ga(s) \times Ge(s) \times Un \\ &= \log_{10}\{V_B \cdot \exp(-a \cdot ø n^{1/2} \cdot Gn \cdot Un)\} \\ &= A \cdot ø n^{1/2} \cdot Gn \cdot Un + B \\ &\quad (A \text{ and } B: \text{constants})\end{aligned}$$

That is, variations of ø and G of each probe result in a gain variation of the closed loop transfer characteristics. In this state, when a servo is applied by the PI control circuit 203, a response frequency of the servo differs in dependence on each probe. In the embodiment, therefore, such a gain variation is compensated for by the compensation circuit 202. An error signal after completion of the compensation is supplied to the PI control circuit 203, thereby performing the servo control to all of the probes at similar precisions.

As mentioned above, in the compensation circuit 202, a coefficient (gn) which is different for every probe is multiplied to the output of the comparator. A measuring method of the coefficient will now be described.

In a state in which the tunnel currents can be detected from all of the probes, the control CPU 114 generates a Z modulation signal of a frequency which is equal to or less than the response frequency of the Z driving device and modulates all of the probes in the Z direction (ΔUn). In this instance, an output (ΔVn) of the logarithmic converter from each probe is monitored. With respect to each probe, the transfer characteristics Gmulti (=ΔVn/ΔUn) of the output of the logarithmic converter are measured from the output Un of the PI control circuit. The coefficients of the compensation circuit are determined so as to keep the values Gmulti constant with respect to all of the probes.

Figure 3:
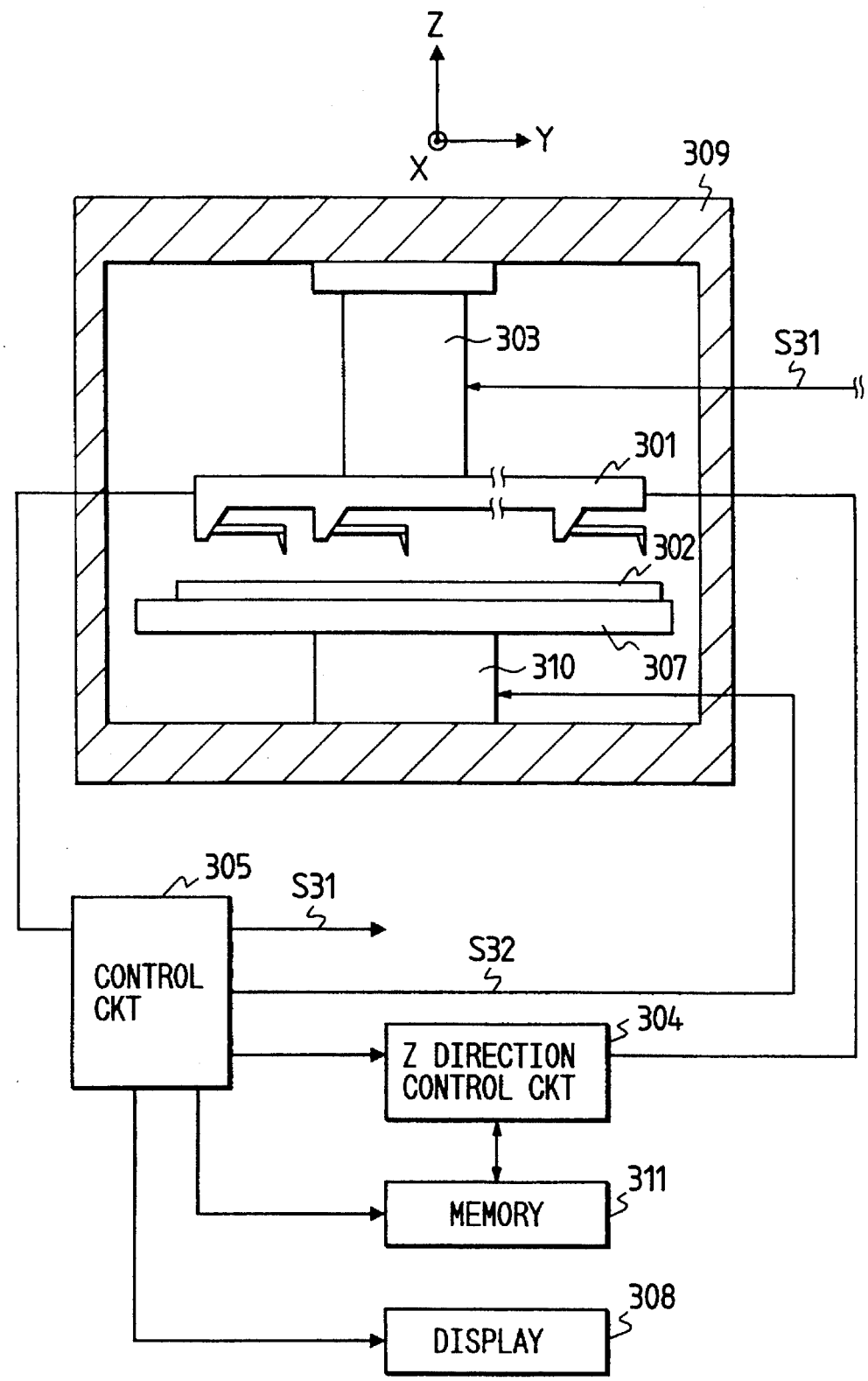
FIG. 3 is a diagram showing a construction of an embodiment of an information processing apparatus which has the control circuit and multiprobe shown in FIGS. 1 and 2 and uses an STM.

FIG. 3 is a diagram showing a construction of an embodiment of an information processing apparatus which has the control circuit and multiprobe as mentioned above and uses an STM.

Reference numeral 301 denotes a mutliprobe head. A method of forming the multiprobe head 301 will now be described with reference to FIGS. 4A and 4B.

Figure 4A:
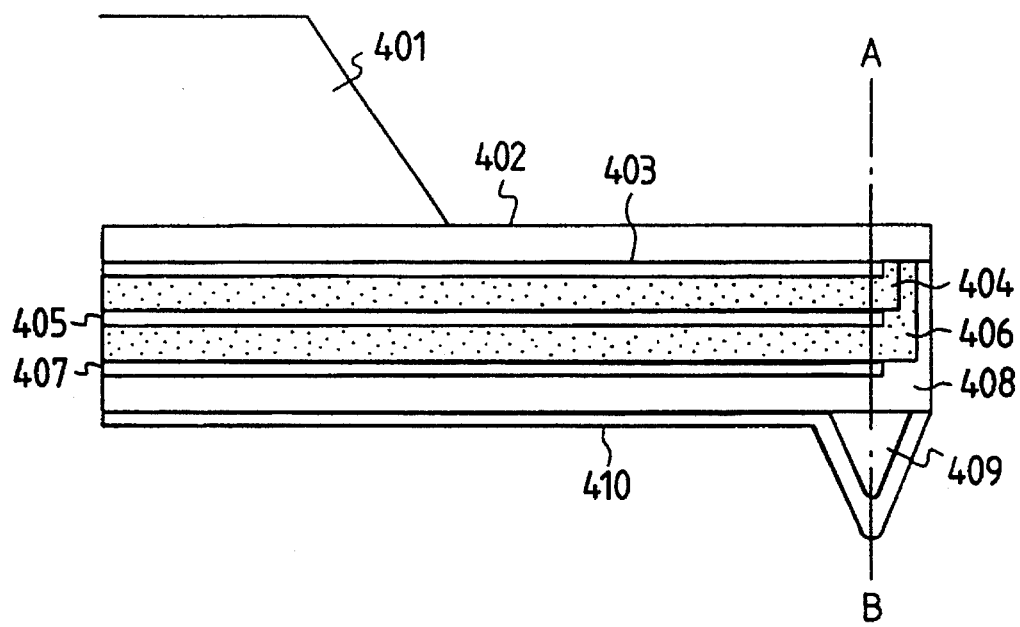
FIG. 4A is a diagram showing a structure of one probe of a multiprobe head.
Figure 4B:
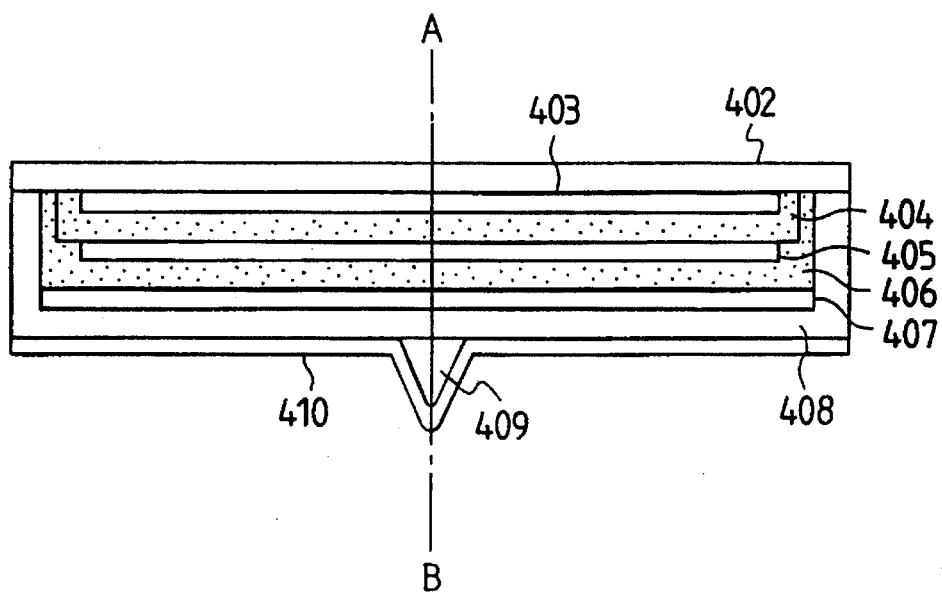
FIG. 4B is a cross sectional view taken along the line A–B in FIG. 4A.

FIG. 4A shows a structure of one probe of the multiprobe head. FIG. 4B is a cross-sectional view taken along the line A–B in FIG. 4A.

In the diagrams, reference numeral 401 denotes an Si substrate; 402 and 408 SiNx layers; 403,405, and 407 electrodes for driving; 404 and 406 piezoelectric thin films; 409 a tip of the probe; and 410 an electrode for the tip.

The cantilever shown in FIG. 4A has a Bimorph structure. By applying a voltage to the cantilever, it is deformed due to a reverse piezoelectric effect. A manufacturing process of the cantilever will now be described hereinbelow.

First, an $Si_3N_4$ film having a thickness of 0.15 μm is formed on an Si (100) substrate (having a thickness of 0.5 μm) by a CVD method. Material gases of $SiH_2C_{12}:NH_3$ (1:9) are used. A substrate temperature is set to 800° C. The $Si_3N_4$ film is patterned into a desired shape by photolithography and a $CF_4$ dry etching. Subsequently, a Cr film having a thickness of 0.01 μm and an Au film having a thickness of 0.09 μm are formed and are patterned by photolithography and a wet etching.

A piezoelectric thin film of AlN having a thickness of 0.3 μm is formed by a sputtering method. Al is used as a target and the AlN thin film is sputtered in the atmosphere of $Ar+N_2$. Further, the AlN thin film is patterned by photolithography and a wet etching using an etchant for Al. After that, the above processes are repeated, thereby forming a Bimorph structure of Si substrate—Au/Cr—AlN—Au/Cr—AlN—Au/Cr. Further, an amorphous SiN film having a thickness of 0.15 μm is formed as a protective layer by a CVD method. After that, a tungsten (W) tip is formed by an evaporation method. Portions without $Si_3N_4$ are removed by using an anisotropic etching of Si by KOH, thereby forming a cantilever. Finally, the W tip is coated with Pt. Dimensions of one cantilever are equal to 700 μm (length)×230 μm (width), a resonance frequency in the Z direction is equal to 3.3 kHz, and an average displacement amount of the Bimorph when a voltage of 1 V is applied is equal to 1.75 μm. A total of 25 (5×5) probes of such a cantilever type are formed in a matrix shape onto an Si wafer. A tunnel current detecting amplifier is further formed near the cantilever type probes on the Si wafer by using an IC process, thereby forming the multiprobe head 301. Displacement sensitivities of 25 probes were measured by an optical method, so that there was a variation of about 20%.

The STM will now be described with reference to FIG. 3 again. Reference numeral 302 denotes a sample to be observed. The multiprobe head 301 faces in close vicinity to the sample 302. The head 301 is attached to an actuator 303 as a fine moving mechanism and, further, to a structure 309. The actuator 303 is controlled by an actuator control signal S31 which is generated from a control circuit 305.

When the surface is observed, in a state in which a bias voltage was applied between the multiprobe head 301 and the sample 302, the actuator 303 is moved while correcting an inclination. The head 301 is allowed to approach the sample 302 up to a distance such that tunnel currents flow from all of the probes. Further, a servo control is applied by a Z direction control circuit 304, which has already been described in detail in FIG. 1, so as to keep constant the distance between all of the probes and the sample 302 which faces them. In this state, the control circuit 305 generates an XY scanning signal S32. The XY scanning signal S32 is supplied to an XY scanning mechanism 310 attached to the structure 309, thereby two-dimensionally scanning a base plate 307 on which the sample 302 is put. In this instance, a tunnel current which changes in accordance with the micro concave and convex portions of the surface of the sample 302 is detected. The detected tunnel current is sent to the control circuit 305 and processed synchronously with the XY scanning signal S32, and STM images from 25 probes are obtained.

Further, the STM images are subjected to an image process such as a two-dimensional FFT or the like and all of the 25 image planes of the processed STM images are synthesized and displayed on a display 308. When an observing position is changed, the sample is moved in the XY direction by an XY coarse moving mechanism (not shown) and the multiprobe head 301 is moved to a desired region, thereby executing the observation.

In the embodiment, the tunnel current signal from the head 301 is compensated for by the Z direction control circuit 304, thereby performing the Z direction control. The compensation data to execute the Z direction control is stored into a memory 311 and the Z direction control as described in FIG. 1 is executed. In the embodiment, in order to obtain the accurate compensation data which is not influenced by the micro concave and convex portions of the surface of the sample, the multiprobe head is allowed to face a standard sample such as HOPG, Si, or the like which is flat for a wide area prior to observing the surface of the sample. All of the probes are modulated in the Z direction ($\Delta Un$) on the standard sample. In this instance, the tunnel current signal from each probe and, further, the logarithmic converter output ($\Delta Vn$) are monitored. The transfer characteristic Gmulti ($=\Delta Vn/\Delta Un$) of the logarithmic converter output are measured from the PI control output Un from each probe, thereby determining the compensation amount. Thus, almost the same STM images are obtained from all of the probes without being influenced by a variation in displacement sensitivity of about 20%.

By using the scanning tunneling microscope of the invention, the multiprobe head having a plurality of probes can be controlled by a small control circuit and the surface of a sample having a wide area can be observed in a short time.

Since the cantilever used in the invention is formed by laminating the piezoelectric thin film of AlN, ZnO, or the like, and the metal thin film, a voltage breakdown easily occurs by applying a voltage of a few V and a destruction of the piezoelectric thin film easily occurs due to the static electricity, charging, or the like. In the case of correcting the gain by the input section of the servo system as in the embodiment, there is an effect which is peculiar to the embodiment such that a plurality of probes can be controlled without causing a dielectric breakdown in the actuator.

In the embodiment, the cantilever type actuator using the reverse piezoelectric effect of the piezoelectric device has been used as a Z direction actuator. However, the actuator is not limited to such a type but, for example, it is also possible to use an actuator using an electrostatic force. In place of the STM, on the other hand, an interatomic force microscope (AFM) having a multiprobe is used, and the AFM also can be applied to the circuit which has a circuit for correcting a variation in elastic constants of the probes and which controls the distance between the probe and the sample.

In the invention, the circuit for adjusting the closed loop gain of the Z servo circuit has been constructed as a compensation circuit. However, the adjustment item is not limited to the gain but it is also possible to construct a filter circuit for compensating for transient characteristics of the displacement due to a variation in mechanical Q value of the actuator as a control target or a compensation circuit of a phase compensation or the like. In order to compensate for a variation of the warp of the cantilever, it is also possible to provide a circuit for multiplexing an offset value corresponding to the warp amount of each cantilever to an input of the D/A converter 108 thereby performing the compensation.

[Embodiment 2]

Figure 5:
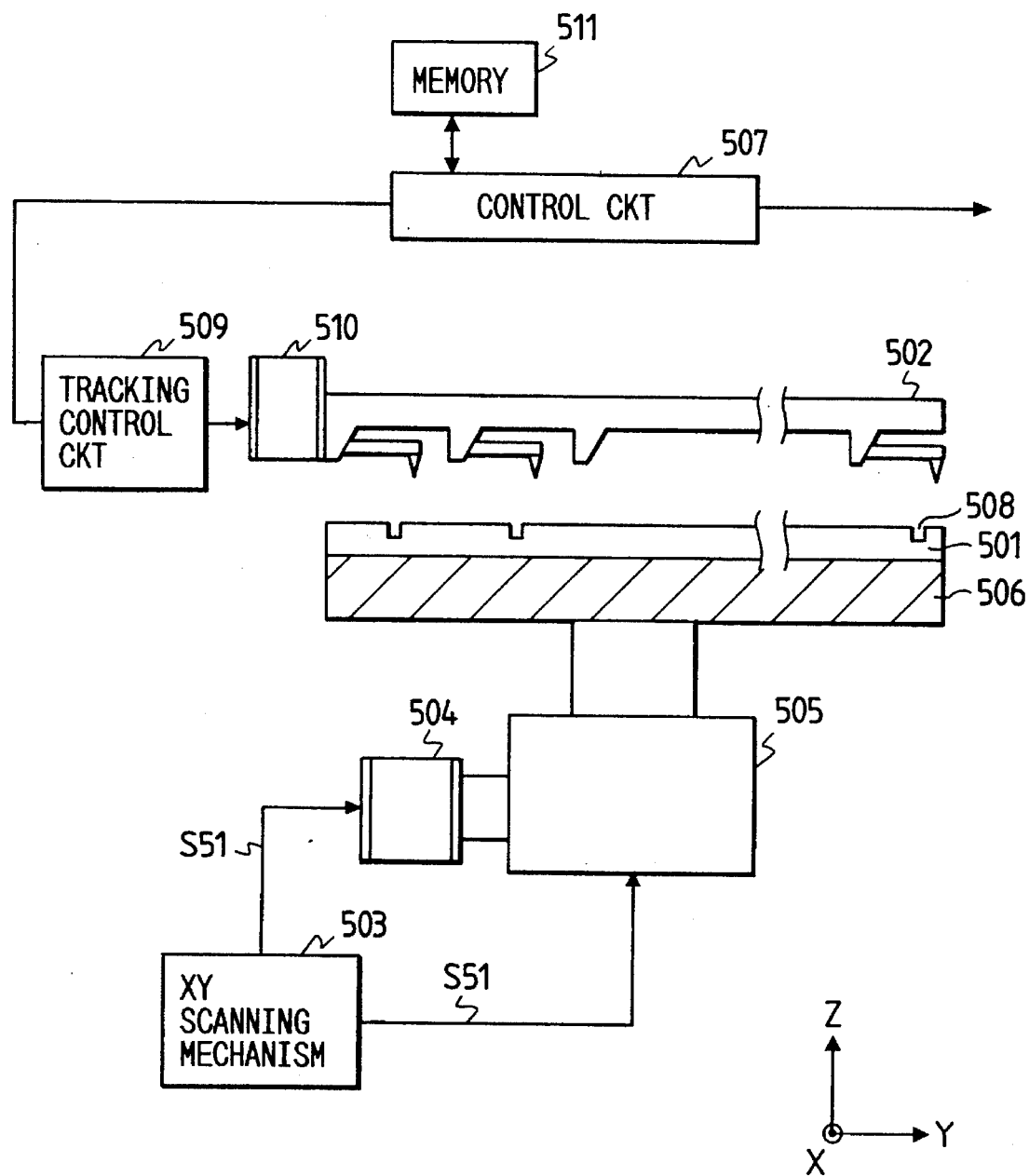
FIG. 5 shows the second embodiment of the invention and is a schematic diagram of a recording/reproducing apparatus having the multiprobe control circuit shown in FIG. 1.

FIG. 5 is a schematic diagram of the second embodiment of a recording/reproducing apparatus as an information processing apparatus according to the invention.

In the diagram, reference numeral 501 denotes a recording medium. A multiprobe head 502 similar to that shown in the embodiment 1 faces in close vicinity to the recording medium 501. The head 502 is attached to a fine moving mechanism such as a stacked piezoelectric device or the like (not shown). The fine moving mechanism allows the head 502 to approach the recording medium 501.

Reference numeral 503 denotes an XY scanning circuit; 504 and 505 actuators for respectively driving in the X and Y directions a stage 506 on which the recording medium 501 is put; and 507 a control circuit to perform the data input/output operations and the Z direction control for every probe.

A recording medium such that a material having a memory effect for switching characteristics of a voltage current was formed on a substrate is used as a recording medium 501. In the embodiment, a substrate such that metal was epitaxially grown on a flat substrate such as glass, mica, or the like is prepared. As a material having the memory effect for the switching characteristics of a voltage current, squarillium-bis-6-octylazulene is used and formed on the substrate. An accumulated film of two layers of monomolecular films is formed on a substrate electrode by a Langmuir-Blodgett's technique (LB technique). A concave-like groove or a tracking pattern 508 having different surface electron states is notched on the recording medium 501. A tracking pattern edge position is detected from the tunnel current change of the probe by a tracking control circuit 509. A tracking error is corrected by a tracking actuator 510.

Experiments of the recording and reproduction were performed as follows by using the above recording/reproducing apparatus.

A bias voltage of 100 mV is applied between the multiprobe head 502 and the recording medium. In this state, the head 502 is allowed to approach the recording medium 501 by the fine moving mechanism such as a stacked piezoelectric device or the like (not shown) up to a distance such that tunnel currents flow from all of the probes. Further, a servo control is applied so as to keep constant the distances between all of the probes and the recording medium which faces them by the Z direction control circuit provided in the control circuit 507 and already described in detail in FIG. 1. In this state, the XY scanning circuit 503 generates an XY scanning signal S51. The XY scanning signal S51 is supplied to the actuators 504 and 505, thereby two-dimensionally scanning the stage 506 on which the recording medium 501 is carried.

The recording was performed as follows. A servo control is applied up to a degree such that tunnel currents of 1 nA flow from all of the probes and the head is allowed to sufficiently approach the recording medium. In this state, the probe is moved to a desired position of the recording medium 501. After that, the bias voltage is modulated and a pulse voltage of 6 V is applied between the probe and the recording medium, so that a pit having a diameter of 10 nmø such that a current of about 0.1 μA instantaneously flows is formed (recorded). When the recording medium is scanned after the pulse voltage was applied, its state is held (reproduced). Therefore, a pit in such a low resistance state is made to correspond to "1" and is distinguished from "0" indicative of a high resistance state. By encoding the recording data to "0" and "1" by an encoder, the binarization recording or reproduction is executed.

In this embodiment as well, the tunnel current signal from the multiprobe is compensated for and the Z direction control is executed. The compensation data for this purpose has been stored in a memory 511. In the embodiment, in order to obtain the compensation data, all of the probes are modulated in the Z direction (ΔUn) on the recording medium 501 prior to the recording or reproduction. In this instance, the tunnel current signal from each probe, further, the logarithmic converter output (ΔVn) are monitored. The transfer characteristics Gmulti=ΔVn/ΔUn of the logarithmic converter output are measured from the PI control output Un from each probe, thereby determining a compensation amount.

[Embodiment 3]

Figure 6:
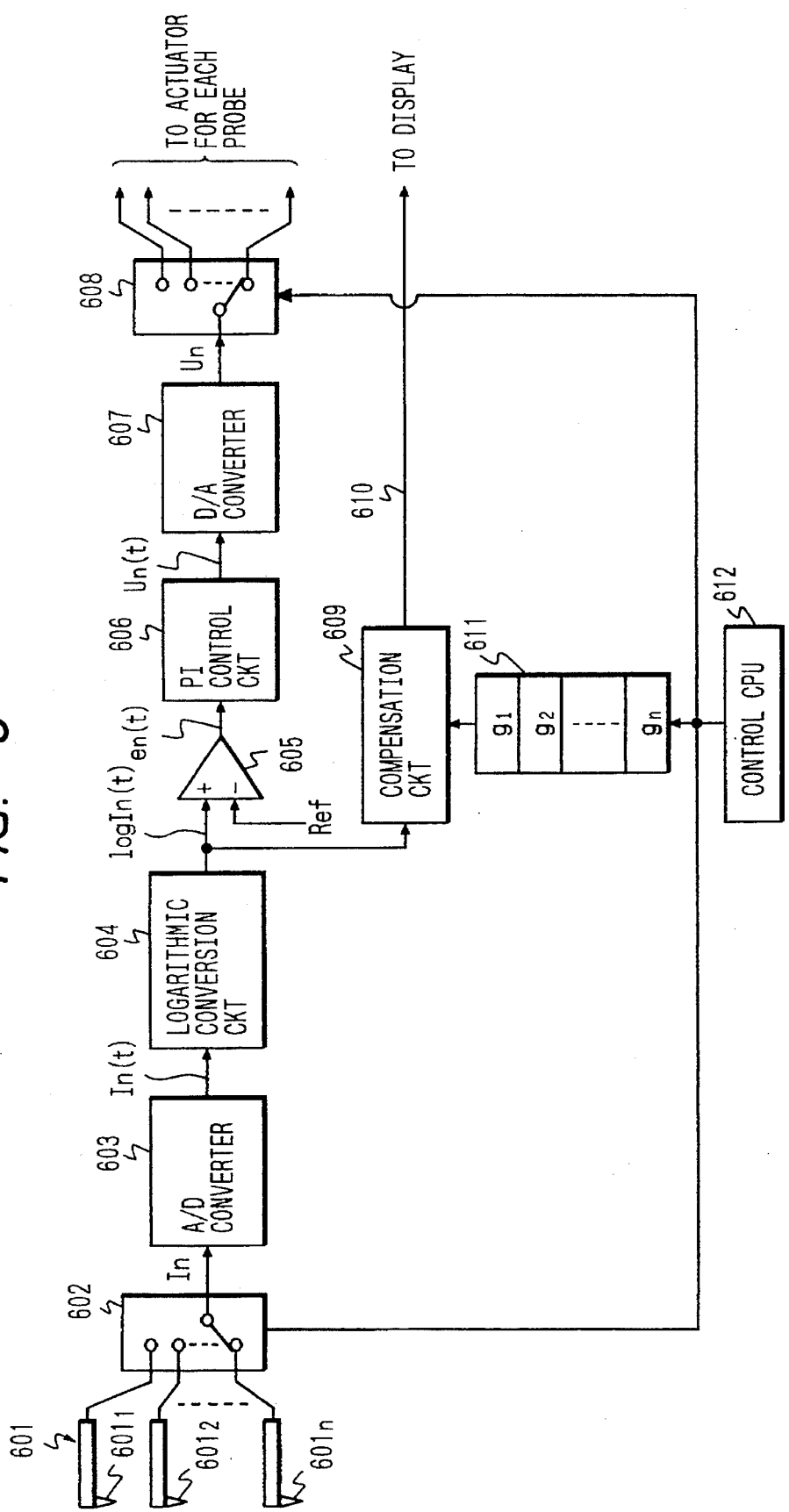
FIG. 6 is a diagram showing an example of a construction of a multiprobe control circuit in the third embodiment of the invention.

FIG. 6 shows an example of a construction of a control circuit of a multiprobe in the third embodiment of the invention. In this embodiment, the tunnel current signal from each probe is converted into a digital signal by using a control CPU 612 and a digital servo system for generating a control signal to sequentially Z control each probe on the basis of a timing signal from the control CPU 612 from which the digital signal is generated. The tunnel current signal is detected while performing position control of each probe.

The Z control of the multiprobe will be first explained in detail with reference to FIG. 6. The tunnel current signals from a multiprobe head 601 shown by probe numbers $601_1$ to $601_n$ are connected to a selecting circuit 602. In accordance with the timing from the control CPU, the selecting circuit 602 selects one of the probes $601_1$ to $601_n$ of the multiprobe head 601, for example, the nth probe $601_n$. The tunnel current signal (in the diagram: In) which is detected from the selected nth probe is converted into the voltage. After that., the voltage is converted into the digital signal (in the diagram: In(t), t denotes a certain sampling time) by an A/D converter 603. Further, the digital tunnel current signal is linearized (in the diagram: logIn(t)) by a logarithmic converter 604 for a change in distance between the probe and the medium (or sample). An output of the logarithmic converter 604 is supplied to a comparator 605, by which it is compared with a set value of the servo circuit. An error signal (in the diagram: en(t)) is derived from the comparator 605. A PI (Proportional+Integral) control circuit 606 produces a distance control signal Un(t) so as to set the error signal into zero. In this instance, the PI control circuit 606 produces a new distance control signal Un(t) at a time (t) from a distance control signal Un(t-1) and error signal data en(t-1) at a sampling time (t-1) and from a compensation error signal en(t) at a sampling time (t). The distance control signal Un(t) is again converted into the analog signal by a D/A converter 607. The analog signal is supplied to an actuator to drive the probe of the corresponding number in the Z direction by a switching circuit 608. The control CPU 612 sequentially switches the probes to be selected and performs the Z control to all of the probes.

For a period of time from a time point after the signal was once supplied to the actuator to a time point when the signal is again supplied to the same actuator, the actuator is set into a floating state. For this period of time, the control voltage is held by the capacity between the electrodes of the actuator. A displacement of the actuator is held. Although each of the above digital arithmetic operating/converting circuits can be made operative at a sufficiently high speed faster than the sampling period, it is also possible to execute what is called a pipeline process by providing a data holding memory for every arithmetic operation.

On the other hand, the tunnel current signal from each probe is compensated for by a compensation circuit 609, so that a compensation current signal 610 is derived. The operation of the compensation circuit 609 will now be described. The logarithmic conversion output of the tunnel current signal detected from each probe is proportional to the distance between the probe and the medium or sample which faces the probe as mentioned above. The STM accesses such an output as a detection signal and processes.

In this instance, the output of the logarithmic converter 604 is expressed by $$\log In = \log 10 \{V_B \cdot \exp(-a \cdot \emptyset n^{1/2} \cdot z)\}$$
$$= A \cdot \emptyset n^{1/2} \cdot z + B$$

where, a, A, B: constants $V_B$: bias voltage between the probe and the sample $\emptyset 1$ to $\emptyset n$: work function values of the probes z: distance between the probe and the medium A variation in ø of each probe results in an amplitude variation of the output of the logarithmic converter 604. When the detection signal is extracted in this state, a level difference of the detection signal is measured for every probe. When such a level difference occurs, in the STM, the brightness and resolution of the image differs for every probe. Therefore, the compensation circuit 609 corrects the gain of the output of the logarithmic converter 604, thereby obtaining the compensation current signal 610 and displaying an image on the display. For this purpose, coefficients (gn) which differ for every probe are stored into a memory 611. The coefficient is multiplied to the output of the logarithmic converter 604 from each probe, thereby obtaining the compensation current signal 610.

A measuring method of the coefficients will now be described. In a state in which the tunnel currents can be detected from all of the probes, the control CPU 612 generates a Z modulation signal for moving the whole multi probe head in parallel in the Z direction, thereby modulating all of the probes in the Z direction ($\Delta Z$). In this instance, the output ($\Delta Vn$) of the logarithmic converter 604 from each probe is monitored. The transfer characteristics Gmulti= $\Delta Vn/z$ of the output of the logarithmic converter 604 for the Z change in height with respect to each probe were measured. The coefficient gn of the compensation circuit was determined so as to keep those transfer characteristics constant for all of the probes.

Figure 7:
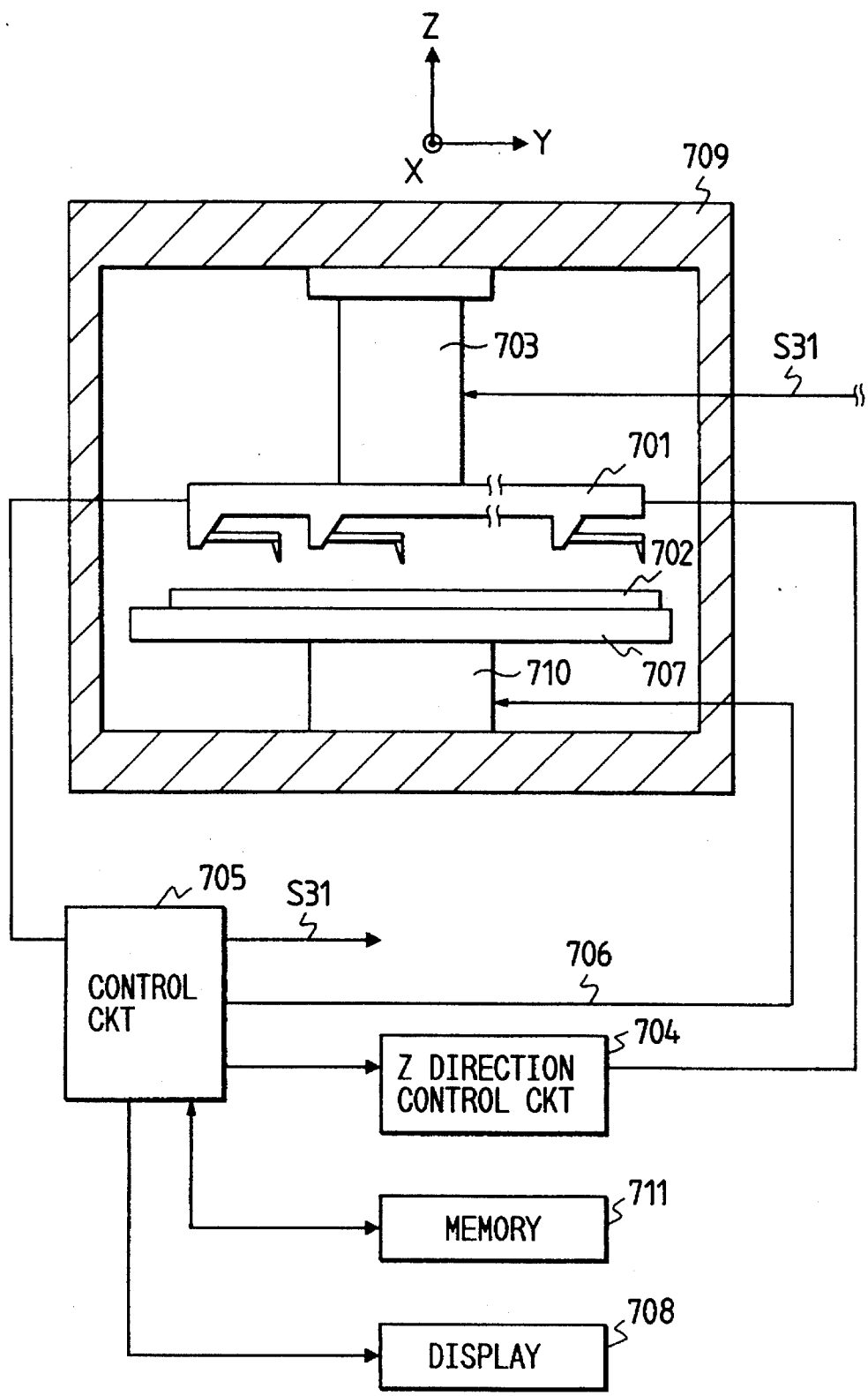
FIG. 7 is a diagram showing a construction of a scanning tunneling microscope having the control circuit of FIG. 6.

FIG. 7 shows a diagram of a structure of an STM having a multiprobe head as an embodiment of the information processing apparatus having the control circuit mentioned above. Reference numeral 701 denotes a multiprobe head.

Figure 8A:
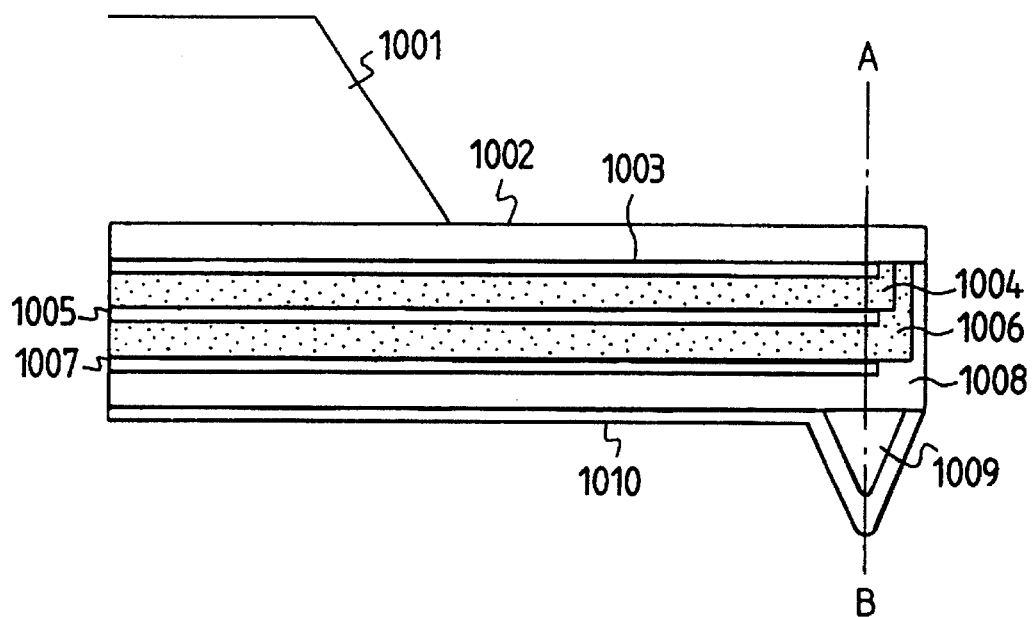
FIG. 8A is an enlarged diagram of a portion near one probe of the multiprobe head in FIG. 7.
Figure 8B:
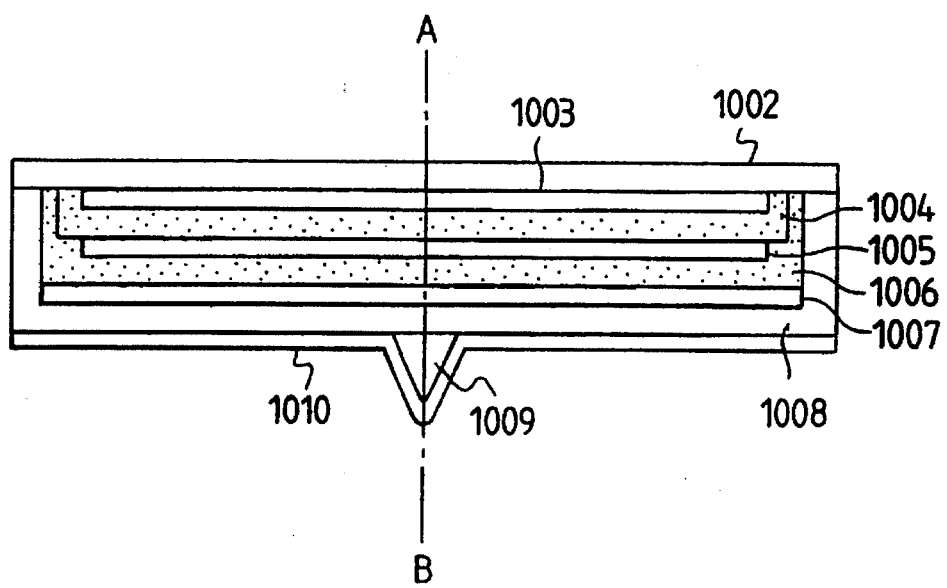
FIG. 8B is a cross sectional view taken along the line A–B in FIG. 8A.

A method of forming the multiprobe head will now be described with reference to FIGS. 8A and 8B. FIG. 8A is a diagram showing a structure of one probe of the multiprobe head. FIG. 8B is a cross-sectional view taken along the line A–B in FIG. 8A. In the diagrams, reference numeral 1001 denotes an Si substrate; 1002 and 1008 SiNx layers; 1003, 1005 and 1007 electrodes for driving; 1004 and 1006 piezoelectric thin films; 1009 a tip of a probe; and 1010 an electrode for the tip. The cantilever has a Bimorph structure. When a voltage is applied, a displacement occurs in the cantilever due to a reverse piezoelectric effect. A manufacturing process of the cantilever will now be described. First, an $Si_3N_4$ film having a thickness of 0.15 µm is formed onto an Si (1001) substrate having a thickness of 0.5 µm by a CVD method. Material gases of $SiH_2Cl_2:NH_3$ (1:9) are used. A substrate temperature is equal to 800° C. The $Si_3N_4$ film is patterned into a desired shape by photolithography and a $CF_4$ dry etching. Subsequently, a Cr film having a thickness of 0.01 µm and an Au film having a thickness of 0.09 µm are formed and are patterned by photolithography and a wet etching. A piezoelectric thin film of AlN having a thickness of 0.3 µm is formed by a sputtering method. Al is used as a target and is sputtered in the atmosphere of $(Ar+N_2)$. Further, the piezoelectric thin film is patterned by photolithography and a wet etching using an etchant for Al. After that, the above processes are repeated, thereby finally forming a Bimorph structure of the Si substrate —Au/Cr—AlN—Au/Cr—AlN—Au/Cr. Further, an amorphous SiN film having a thickness of 0.15 µm is formed as a protective layer by a CVD method. After that, a tungsten (W) tip is formed by an evaporating method. After that, the portions without $Si_3N_4$ are removed by using an anisotropic etching of Si by KOH, thereby forming a cantilever. Finally, the W tip is coated with Pt. The dimensions of one cantilever are set to 700 µm (length)×230 µm (width). A resonance frequency in the Z direction is set to 3.3 kHz. An average displacement amount of the Bimorph when the voltage of 1 V is applied is equal to 1.75 µm. A total of 25 (5×5) cantilever type probes are arranged in a matrix shape. Further, a tunnel current detecting amplifier is constructed near the cantilever type probe on the Si wafer by using an IC process, thereby obtaining the multiprobe head 701.

The STM will now be described with reference to FIG. 7 again. Reference numeral 702 denotes a sample to be observed. The multiprobe head 701 faces in close vicinity to the sample 702. The head 701 is attached to an actuator 703 as a fine moving mechanism and, further, to a structure 709.

When the surface is observed, in a state in which a bias voltage is applied between the head 701 and the sample 702, the actuator 703 is moved while correcting the inclination. The head 701 is allowed to approach the sample 702 up to a distance such that the tunnel currents flow from all of the probes. Further, a servo control is applied by a Z control circuit 704 already described in FIG. 6 so as to keep constant the distances between all of the probes and the sample which faces them. In this state, a control circuit 705 generates an XY scanning signal 706. The XY scanning signal 706 is supplied to an XY scanning mechanism 710 attached to the structure 709, thereby two-dimensionally raster scanning a base plate 707 on which the sample 702 is put. A tunnel current which changes due to the micro concave and convex portions of the surface of the sample is detected. The tunnel current is sent to the control circuit 705 and processed synchronously with the XY scanning signal. By executing the above processes with respect to all of the 25 probes, the STM images from 25 probes can be derived. Further, the STM images are subjected to an image process such as a two-dimensional FFT or the like. All of the 25 processed image planes are synthesized and displayed on a display 708. To change the observing position, the sample is moved in the XY direction by an XY coarse moving mechanism (not shown) and the multiprobe head 701 is moved to a desired region, and the sample is observed.

The control circuit 705 compensates for the tunnel current signal from the multiprobe head and supplies the compensated signal as a concave/convex signal to the display. The compensation data for this purpose is stored in a memory 711 and the current signal is compensated for as described in FIG. 6.

In the embodiment, to obtain the accurate compensation data which is not influenced by the micro concave and convex portions of the sample surface, prior to observing the sample surface, the multiprobe head is arranged so as to face a standard sample of HOPG, Si, or the like which is flat and uniform for a wide area. On the standard sample, the whole probe head is simultaneously modulated ($\Delta Z$) in the Z direction by using an actuator (not shown). In this instance, the logarithmic converter output ($\Delta Vn$) from each probe is monitored. The transfer characteristics Gmulti=$\Delta Vn/Z$ of the logarithmic converter output for the Z change in height with respect to each probe were measured. By measuring them, a variation in sensitivity of the tip of each probe can be calculated. The coefficient gn of the compensation circuit was determined so as to keep such variations constant for all of the probes. Thus, stable STM images can be similarly obtained from all of the probes without being influenced by the sensitivity variation of the tip of each probe.

By using the scanning tunneling microscope of the invention, the multiprobe head having a plurality of probes can be controlled by a small control circuit and the surface of the sample having a wide area can be observed in a short time.

In the invention, although the cantilever type actuator using the reverse piezoelectric effect of the piezoelectric device has been used as a Z direction actuator, the actuator is not limited to such a type but, for example, an actuator using an electrostatic force also can be used. In place of the STM, an interatomic force microscope (AFM) having a multiprobe is used and the AFM also can be applied to a circuit for compensating for a signal representing the distance between the probe and the sample or the force which is caused due to a variation in elastic constant of the probe.

[Embodiment 4]

Figure 9:
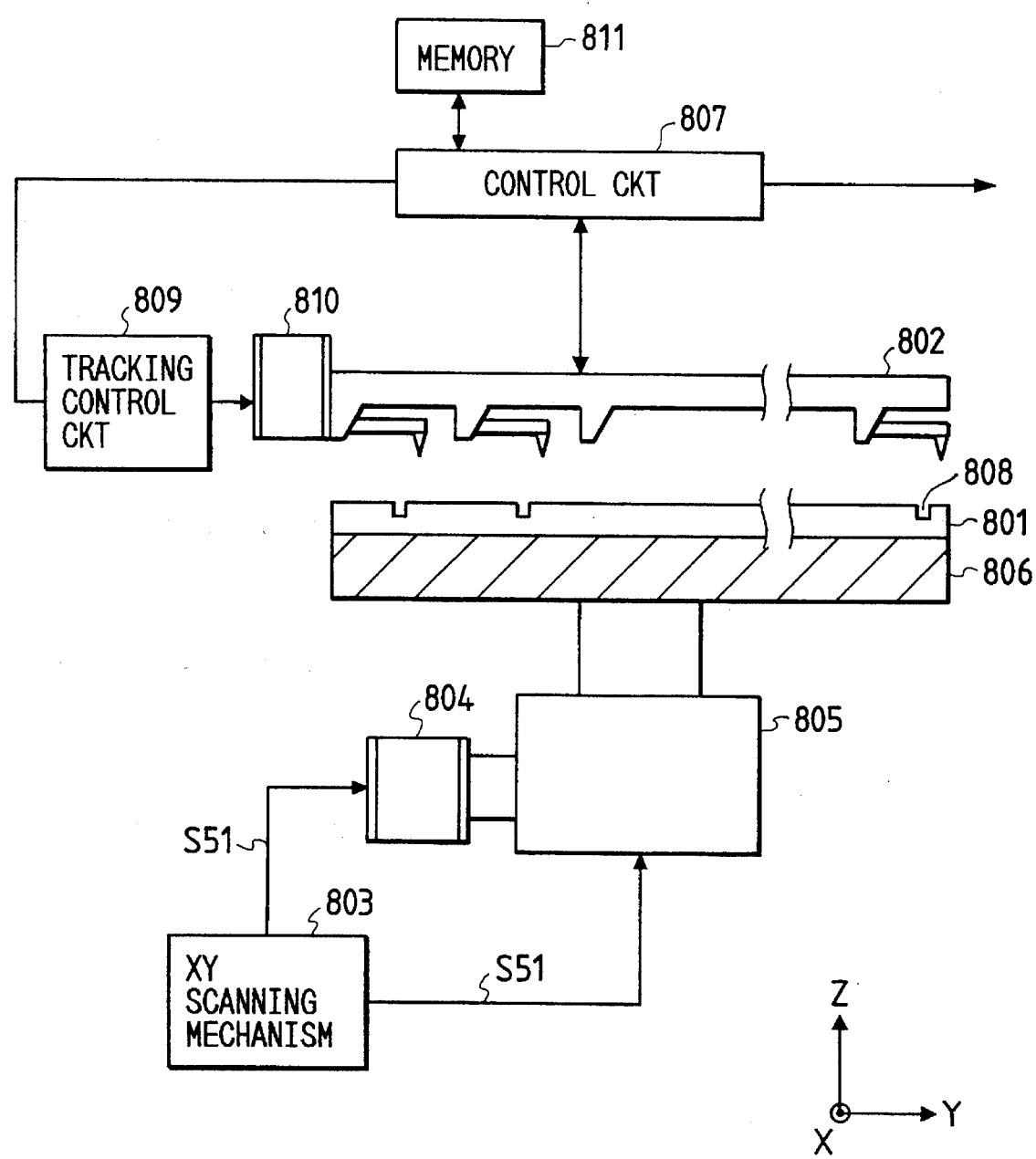
FIG. 9 is a diagram showing a construction of a recording/reproducing apparatus according to the second embodiment of the invention.

FIG. 9 is a schematic diagram of a recording/reproducing apparatus as an information processing apparatus as a fourth embodiment according to the invention. Reference numeral 801 denotes a recording medium. A multiprobe head 802 similar to that shown in the the third embodiment faces in close vicinity to the recording medium 801. The head 802 is attached to a fine moving mechanism such as a stacked piezoelectric device or the like (not shown). The fine moving mechanism allows the head 802 to approach the recording medium 801.

Reference numeral 803 denotes an XY scanning circuit; reference numeral 804 and 805 actuators for respectively driving in the X and Y directions a stage 806 on which the recording medium 801 is put; and 807 a control circuit to perform the data input/output operations and the Z direction control of each probe.

As a recording medium 801, a medium such that a material having a memory effect for the switching characteristics of a voltage current was formed on a substrate is used. In the embodiment, a substrate such that gold was epitaxially grown on a flat substrate of glass, mica, or the like is prepared. On such a substrate, as a material having a memory effect for the switching characteristics of the voltage current, squarillium-bis-6-octylazulene is used and an accumulated film of two layers of monomolecular films is formed onto a substrate electrode by a Langmuir-Blodgett's technique (LB technique). A concave-like groove or a tracking pattern 808 having different surface electron states is notched on the recording medium 801. A tracking pattern edge position is detected by a tracking control circuit 809 from the tunnel current change of the probe. A tracking error is corrected by a tracking actuator 810.

Experiments of the recording and reproduction were executed as follows by using the recording/reproducing apparatus. A bias voltage of 100 mV is applied between the multiprobe head 802 and the recording medium 801. In this state, the head 802 is allowed to approach the recording medium 801 by a fine moving mechanism such as a stacked piezoelectric device or the like (not shown) up to a distance such that tunnel currents flow from all of the probes. Further, a servo control is applied so as to keep constant the distances between all of the probes and the sample which faces them by the Z control circuit provided in the control circuit 807 and already described in detail in FIG. 6. In this state, the XY scanning circuit 803 generates an XY scanning signal. The XY scanning signal is sent to the actuators 804 and 805, thereby two-dimensionally scanning the stage 806 on which the recording medium 801 is put.

The recording was performed as follows. A servo control is applied up to a degree such that the tunnel currents of 1 nA flow from all of the probes, thereby allowing the head to approach the recording medium. In this state, the probe is moved to a desired position of the recording medium 801. After that, the bias voltage is modulated. A pulse voltage of 6 V is applied between the probe and the recording medium. A pit having a diameter of 10 nmø such that a current of about 0.1 μA instantaneously flows is formed (recorded). When the recording medium is scanned after the pulse voltage was applied, its state is held (reproduction). Therefore, the pit in such a low resistance state is made to correspond to "1" and is distinguished from "0" indicative of a high resistance state. Encoding the recording data into "0" and "1" by an encoder, thereby performs the binarization recording or reproduction.

Figure 10:
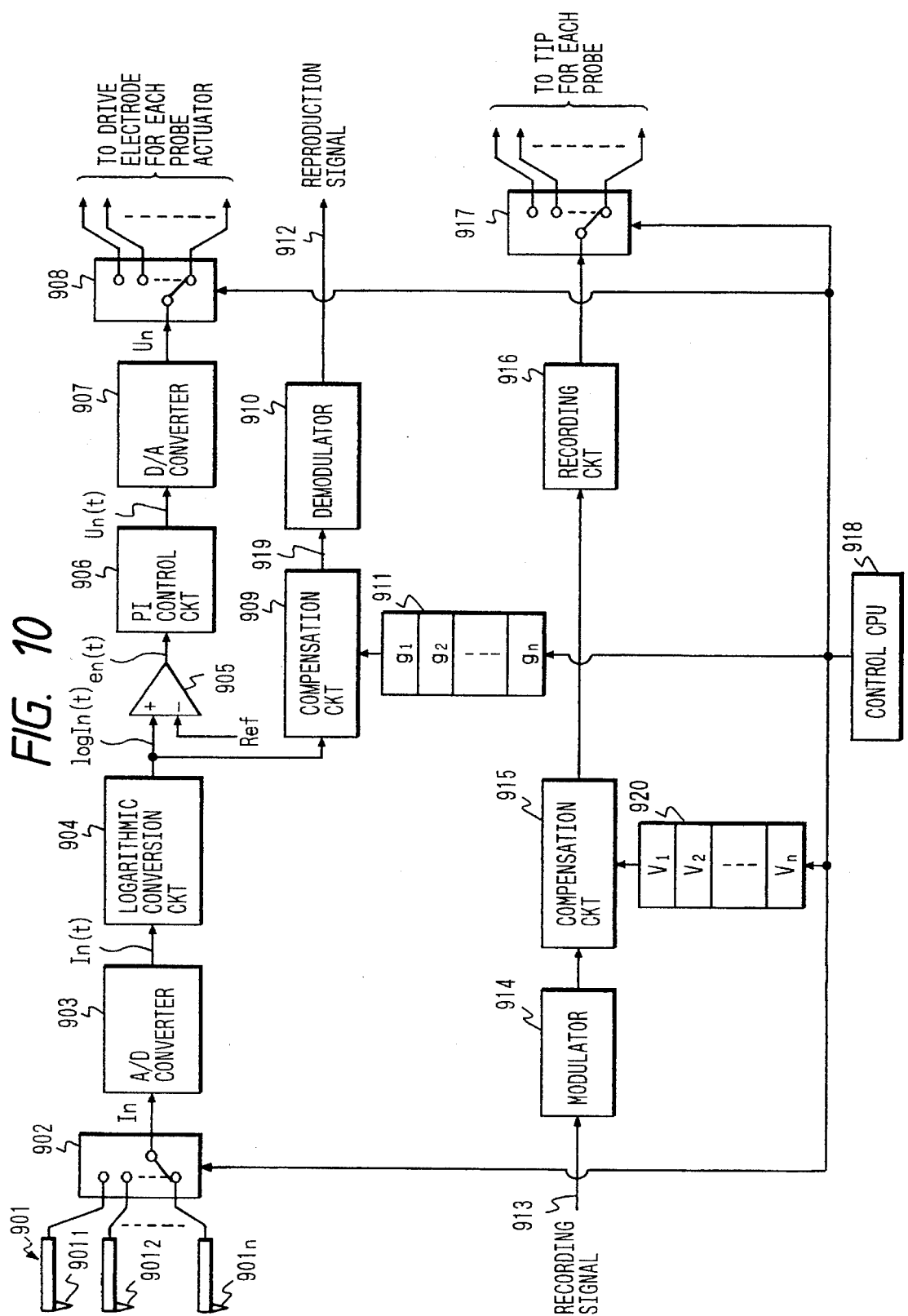
FIG. 10 is a diagram showing a construction of a multiprobe control circuit used in FIG. 9.

In this embodiment as well, the tunnel current signals from the multiprobe are compensated for thereby performing the signal recording and reproduction. The control circuit will now be described with reference to FIG. 10.

In this embodiment as well, the tunnel current signal from each probe is converted into a digital signal by using a control CPU 918 and a digital servo system for generating a control signal to sequentially Z control each probe on the basis of a timing signal from the control CPU 918 which the digital signal is generated. The tunnel current signal is detected while executing the position control of each probe. The tunnel current signals from a multiprobe head 901 having probes $901_1$ to $901_n$ are connected to a selecting circuit 902. In accordance with the timing from the control CPU, the selecting circuit 902 selects one of the nth probe $901_n$. The tunnel current signal (In) from the probes of the multiprobe head 901, for example, the selected nth probe is converted into the digital signal by an A/D converter 903 and is linearized by a logarithmic converter 904, so that a signal (in the diagram: login(t)) which is linear to a change in distance between the probe and the medium is obtained. An output of the logarithmic converter 904 is supplied to a comparator 905, by which it is compared with a set value of the servo circuit. An error signal (in the diagram: en(t)) is derived from the comparator 905. A PI control circuit 906 produces a distance control signal Un(t) so as to set the error signal to zero. The distance control signal Un(t) is again converted into the analog signal by a D/A converter 907 and is supplied to the actuator to drive the probe of the corresponding number in the Z direction by a switching circuit 908. The control CPU 918 sequentially switches the probes to be selected, thereby Z controlling all of the probes.

On the other hand, the tunnel current signal from each probe is compensated for by a compensation circuit 909, so that a compensation current signal 919 is derived. In a manner similar to the third embodiment, a ø variation of each probe results in an amplitude variation of the output of the logarithmic converter 904. When the detection signal is extracted in this state, a level difference of the detection signal is measured for every probe. When such a level difference occurs, a signal reproduction error occurs due to the level difference of the reproduction signal in the information recording/reproducing apparatus. Therefore, the compensation circuit 909 compensates for the gain of the output of the logarithmic converter 904, thereby obtaining the compensation current signal 919. Further, the compensation current signal having no level difference is supplied to a demodulator 910, thereby obtaining a reproduction signal 912. Therefore, the coefficients (gn) which differ for every probe are stored into a memory 911 and the coefficient is multiplied to the output from each probe.

A measuring method of the coefficient is similar to that in the third embodiment. In a state in which the tunnel currents can be detected from all of the probes, a Z modulation signal to move the whole multiprobe head in parallel in the Z direction is generated, thereby modulating all of the probes in the Z direction (ΔZ). In this instance, the logarithmic converter output (ΔVn) from each probe is monitored and the transfer characteristics Gmulti=ΔVn/Z of the logarithmic converter output for the Z change in height with respect to each probe were measured and the coefficient gn of the compensation circuit was determined.

In the recording mode, the control CPU 918 also executes the recording control by a compensation circuit 915 so as to eliminate an influence by the probe variation. As mentioned above, the work function value of the probe changes in dependence on a contamination of the probe or the like. Namely, the tip of the probe of a low sensitivity is covered by a polluted layer. Even when a recording voltage signal is applied by such a probe, no voltage is applied to the recording layer of the recording medium or a current flowing in the recording layer is limited, so that a recording error is caused. Therefore, the compensation circuit 915 adjusts the recording voltage amplitude for every probe. In accordance with the characteristics Gmulti=ΔVn/Z which reflect the work function variation of the probe, a pulse voltage height of 6 V as an ordinary recording voltage is compensated for to a maximum of 10 V and is stored as a compensation recording voltage into a memory 920. A recording signal 913 is modulated by a modulator 914. After that, the modulated signal is supplied to a recording circuit 916 as a voltage signal to be applied to each probe by the compensation circuit. The control CPU 918 sequentially selects the probes by a switching circuit 917. The recording circuit 916 supplies the recording voltage signal to the selected probe in accordance with the recording data, thereby recording the digital data.

In the invention, the recording voltage has been compensated for so as to compensate for the tip variation of the probe. However, the invention also can be applied to a control circuit to compensate the recording voltage value for every probe so as to set off a macro variation of the medium (for example, thickness variation of the LB film of the recording medium). An item to be compensated for is not limited to the voltage value upon recording. It is also possible to compensate in a manner such that the current which is applied for recording, the recording time, or the like is made different for every probe in accordance with the recording medium.

Further, a recording/reproducing apparatus according to the invention is not limited to an apparatus such that the probe two-dimensionally XY raster scans onto the recording medium as shown in the embodiments. For example, it is also possible to record pits or to reproduce the signal in the circumferential track direction while circumferentially or spirally moving the probe.

What is claimed is:

1. An apparatus for effecting observation of a surface of an object using a plurality of probes, comprising:

a plurality of probes;

a plurality of actuators provided for the respective probes for displacing the respective probes;

a single control circuit which is selectively connected to the plurality of actuators; and a switching circuit for selectively connecting the plurality of actuators to the control circuit.

2. An apparatus according to claim 1, wherein said control circuit controls a distance between each of the plurality of probes and the surface of the object.

3. An apparatus according to claim 2, further comprising a probe switching circuit for connecting said control circuit to the probe associated with the actuator connected to said control circuit by said switching circuit, wherein the probe, said control circuit and the actuator are connected to constitute a servo loop.

4. An apparatus according to claim 3, further comprising memory means for storing a compensation value for compensating for control characteristics of said control circuit for each servo loop so as to substantially equalize the control characteristics of the servo loops respectively associated with the plurality of actuators.

5. An apparatus according to claim 4, wherein the compensation value is provided to compensate for a variation in gains existing among the servo loops.

6. An information recording/reproducing apparatus for effecting recording of information on and/or reproduction of information from a recording medium using a plurality of probes, said apparatus comprising:

a plurality of probes;

a plurality of actuators provided for the respective probes for displacing the respective probes;

a single control circuit which is selectively connected to the plurality of actuators; and a switching circuit for selectively connecting said control circuit with the plurality of actuators.

7. An apparatus according to claim 6, wherein said control circuit controls a distance between each of said plurality of probes and the recording medium.

8. An apparatus according to claim 7, further comprising a probe switching circuit for connecting said control circuit to the probe associated with the actuator connected to said control circuit by said switching circuit, wherein the probe, said control circuit and the actuator are connected to constitute a servo loop.

9. An apparatus according to claim 8, further comprising memory means for storing a compensation value for compensating for control characteristics of said control circuit for each servo loop so as to substantially equalize the control characteristics of the servo loops respectively associated with the plurality of actuators.

10. An apparatus according to claim 9, wherein the compensation value is provided to compensate for a variation in gain existing among the servo loops.

11. An apparatus for effecting observation of a surface of an object using a plurality of probes, comprising:

a plurality of probes;

a single signal processing circuit which is selectively connected to the respective probes; and a switching circuit for selectively connecting said signal processing circuit to the plurality of probes.

12. An apparatus according to claim 11, wherein said signal processing circuit processes observation information regarding the surface of the object, obtained through the plurality of probes.

13. An apparatus according to claim 12, further comprising:

compensation means for compensating for the observation information using a compensation value so as to remove influence due to a variation in sensitivity existing among the plurality of probes; and memory means for storing the compensation value to be used in said compensation means in association with each of the plurality of probes.

14. An information recording/reproducing apparatus for effecting recording of information on and/or reproduction of information from a recording medium using a plurality of probes, said apparatus comprising:

a plurality of probes;

a single signal processing circuit which is selectively connected to the plurality of probes; and a switching circuit for selectively connecting said signal processing circuit to the plurality of probes.

15. An apparatus according to claim 14, wherein said signal processing circuit processes information on the recording medium, which is reproduced through the plurality of probes.

16. An apparatus according to claim 15, further comprising:

compensation means for compensating for the observation information using a compensation value so as to remove influence due to a variation in sensitivity existing among the plurality of probes from the observation information obtained through the plurality of probes; and memory means for storing the compensation value to be used in said compensation means in association with each of the plurality of probes.

17. An apparatus according to claim 14, wherein said signal processing circuit processes information to be recorded on the recording medium through the plurality of probes.

18. An apparatus according to claim 17, further comprising:

compensation means for compensating for the information to be recorded on the recording medium through the plurality of probes by using a compensation value so as to remove influence due to variation in sensitivity existing among the plurality of probes from the information; and memory means for storing the compensation value to be used in said compensation means in association with each of the plurality of probes.

* * * * *

UNITED STATES PATENT AND TRADEMARK OFFICE
CERTIFICATE OF CORRECTION

PATENT NO. : 5,471,458
DATED : November 28, 1995
INVENTOR(S) : TAKAHIRO OGUCHI, ET AL.

It is certified that error appears in the above-indentified patent and that said Letters Patent is hereby corrected as shown below:

COLUMN 1:

Line 19, ""Phys Rev Lett"" should read --"Phys. Rev. Lett.",--; and

Line 20, "No1," should read --No. 1,--.

COLUMN 2:

Line 14, "Vol. November," should be deleted;

Line 15, "to 97, 1986." should read --to 97, November, 1986.--;

Line 17, "equation" should read --equation:--;

Line 36, "are" should read --the--;

Line 37, "the" should read --are--; and

Line 65, ".such" should read --such--.

COLUMN 4:

Line 42, "login(t)]." should read --logIn(t)].--; and

Line 62, "at-a" should read --at a--.

UNITED STATES PATENT AND TRADEMARK OFFICE
CERTIFICATE OF CORRECTION

PATENT NO. : 5,471,458
DATED : November 28, 1995
INVENTOR(S) : TAKAHIRO OGUCHI, ET AL.

It is certified that error appears in the above-indentified patent and that said Letters Patent is hereby corrected as shown below:

COLUMN 10:

Line 6, "that.," should read --that,--; and

Line 56, "VB:" should read --$V_B$:--.

COLUMN 14:

Line 13, "the nth probe" should read --the probes of the multiprobe head 901, for example, the nth probe--;

Line 14, "probes of the" should be deleted;

Line 15, "multiprobe head 901, for example, the" should be deleted; and

Line 18, "login(t))" should read --logIn(t))--.

Signed and Sealed this

Ninth Day of April, 1996

Attest:

BRUCE LEHMAN

Attesting Officer

Commissioner of Patents and Trademarks